United States Patent

Naito et al.

Patent Number: 5,913,576
Date of Patent: Jun. 22, 1999

[54] ANTI-LOCK BRAKE CONTROL SYSTEM FOR MOTOR VEHICLE AND BRAKE FORCE CONTROL METHOD THEREFOR

[75] Inventors: Yasuo Naito; Chiaki Fujimoto; Mitsuhiro Mimura, all of Tokyo, Japan

[73] Assignee: Mitsubishi Denki Kabushiki Kaisha, Tokyo, Japan

[21] Appl. No.: 08/862,989

[22] Filed: May 27, 1997

[30] Foreign Application Priority Data

May 27, 1996 [JP] Japan ............................. 8-132200

[51] Int. Cl.$^6$ ............................................. B60T 8/72
[52] U.S. Cl. ............................... 303/112; 303/183
[58] Field of Search .............................. 303/112, 187, 303/183, 188, 177, 189, 156, 157, 158

[56] References Cited

U.S. PATENT DOCUMENTS

| | | | |
|---|---|---|---|
| 4,043,607 | 8/1977 | Signorelli | 303/112 |
| 5,657,229 | 8/1997 | Naito et al. | 303/112 |

FOREIGN PATENT DOCUMENTS

| | | |
|---|---|---|
| 583 988 | 2/1994 | European Pat. Off. . |
| 39 06 680 | 9/1989 | Germany . |
| 195 40 650 | 5/1996 | Germany . |
| 195 20 807 | 6/1996 | Germany . |
| 197 20 644 | 11/1997 | Germany . |
| 7-47950 | 2/1995 | Japan . |

*Primary Examiner*—Matthew C. Graham
*Attorney, Agent, or Firm*—Sughrue, Mion, Zinn, Macpeak & Seas, PLLC

[57] ABSTRACT

An apparatus for preventing a brake force from increasing in excess upon starting of an anti-lock brake control for enhancing initial brake performance of an anti-lock brake control system. Rotation speed of each of wheels is detected, and wheel acceleration is determined. Further, a corrected acceleration is determined by correcting the wheel acceleration with a torsion torque detected from a driving shaft. In dependence on the statuses of the wheel acceleration and the corrected acceleration, a rate at which the brake force is increased is modified. Enhanced brake performance in the initial control phase can be ensured when the motor vehicle is running on a road exhibiting high friction coefficient while stability of the motor vehicle running on a road of low friction can be realized. Besides, even when difference frictions act on left and right wheels, the motor vehicle is protected against yawing moment.

6 Claims, 9 Drawing Sheets

ANTI-LOCK BRAKE CONTROL SYSTEM FOR MOTOR VEHICLE AND BRAKE FORCE CONTROL METHOD THEREFOR

BACKGROUND OF THE INVENTION

1. Field of the Invention

The present invention relates generally to an anti-lock brake control system for a motor vehicle in which driving wheels thereof are driven by a prime mover such as an internal combustion engine by way of a torque transmitting member such a driving shaft subjected to a torsion torque. More particularly, the invention is concerned with the anti-lock brake control system which is designed for controlling brake forces applied to the wheels in initial braking phase in such manner that a short stopping distance can be realized, while ensuring a high stability for the brake operation. The invention also concerns a brake force control method which can be carried out by a microcomputer or the like.

2. Description of Related Art

In general, in the anti-lock brake control system for the motor vehicle, a trend of wheels being locked is detected on the basis of the result of comparison between the wheel speed (rpm) and an estimated speed of the motor vehicle or on the basis of deceleration of the wheel. In that case, braking hydraulic pressure applied to the wheel is so regulated that magnitude of skid of the wheel relative to the road surface is maintained at a value close to a region in which friction between the wheel and the road surface assumes a peak value, with a view to shortening the stopping distance of the motor vehicle, while ensuring stability of the motor vehicle and enhancing the manipulatability or driving performance thereof. By way of example, in the conventional anti-lock brake control system known heretofore, decision is made to the effect that the wheel of the motor vehicle tends to be locked when behavior of the wheel such as a slip thereof which represents a sink of the wheel speed relative to the estimated vehicle body speed attains a predetermined threshold value, whereupon the braking hydraulic pressure applied to the wheel is lowered under control.

As is known in the art, a reaction force exerted by a road surface to the wheels of a motor vehicle is given by a product of a friction coefficient of the road surface and a load applied to the wheel. Accordingly, upon sudden or hard application of brake, the brake force applied to the wheel increases rapidly before the load is sufficiently shifted to the wheels, as a result of which tendency of the wheel being locked increases rapidly and steeply. In that case, the anti-lock brake control system issues a command for reducing the brake force because of the wheel lock tendency mentioned above. Consequently, the brake force becomes lowered notwithstanding of the hard brake application as mentioned above. Such unwanted situation is likely to occur particularly when the motor vehicle is running on a road having high friction coefficient such as an asphalt-surfaced road.

As an attempt for coping with the phenomenon mentioned above, the conditions for allowing the braking hydraulic pressure to decrease in the initial or starting phase of the anti-lock brake control (i.e., immediately after the anti-lock brake control is started) are set more severe when compared with the braking hydraulic pressure lowering conditions adopted when the anti-lock brake control system is operating, by setting the threshold value for comparison with the wheel acceleration or slip for thereby validating reduction of the brake application pressure so that the braking hydraulic pressure is more difficult to decrease in the initial braking phase. However, by setting the brake application pressure lowering condition more severe at the start of the anti-lock brake control, there may arise a possibility that the slip of the wheel relative to the road surface increases remarkably particularly when the motor vehicle is running on a road having a road surface of low friction coefficient such as a frozen road surface. Such being the circumstances, in the conventional anti-lock brake control system, there is adopted a method for searching a compromising threshold level in an effort to solve simultaneously the two problems mentioned above.

For having better understanding of the present invention, description will first be made in some detail of the technical background of the invention. For coping with the problems mentioned above, there is disclosed, for example, in Japanese Unexamined Patent Application Publication No. 47950/1995 (JP-A-7-47950) such a control method as illustrated in FIG. 9. Referring to the figure, when a braking hydraulic pressure P is increased, a wheel speed Vw becomes lower with a wheel acceleration Gw decreasing gradually. When the wheel acceleration Gw becomes lower than a predetermined threshold value $\alpha$ (i.e., when Gw<$\alpha$) at a time point t21, the slope or rate at which the braking hydraulic pressure P is increased is modified or changed. Subsequently, as the braking hydraulic pressure increases, the wheel speed Vw becomes lowered steeply with the brake force applied to the wheel exceeding the reaction force of the road surface. As a result of this, when the slip of the wheel reaches a predetermined value $\lambda$ at a time point t22, the braking hydraulic pressure is decreased, whereupon the conventional anti-lock brake control is started. In this manner, by modifying or changing once the slope or rate at which the braking hydraulic pressure is increased before starting the anti-lock brake control when the motor vehicle is running on a road having a high friction coefficient, the brake force can be increased in conformance with the load shift. Thus, there can be ensured a sufficiently high brake force even in the initial or starting phase of the anti-lock brake control. On the other hand, on a road surface of a low friction coefficient, the anti-lock brake control is started with a delay for preventing the braking hydraulic pressure from becoming excessively high. Thus, a large slip of the wheel can be suppressed in the initial phase of the anti-lock brake control, whereby running stability of the motor vehicle can be assured.

In the conventional anti-lock brake control system described above, the brake force is controlled in dependence on the wheel speed and the wheel acceleration. It is however noted that such brake force control is effectuated only when such situation arises in which the brake force has increased steeply. In that case, the driving wheels operatively coupled to the internal combustion engine serving as the prime mover by means of driving shafts such as axle shafts are forced to decelerate rapidly. However, because the internal combustion engine has a large inertia, deceleration of the engine rotation takes place at a lower rate when compared with that of the driving wheel. As a result of this, the driving shaft is subjected to torsion of a large magnitude, and thus the behavior of the driving wheel does not conform with the brake force and the reaction force of the road surface under the influence of the torsion of the driving shaft.

More specifically, when the brake force applied to the driving wheel rises up steeply, the rotation speed (rpm) of the driving wheel becomes lower when compared with that of the internal combustion engine. In that case, such a driving force acts on the driving wheel which urges the rotation speed of the driving wheel to increase to thereby prevent the rotation speed of the driving wheel from the tendency of becoming lower under the influence of the inertia of the internal combustion engine. By contrast, the engine is applied with the brake force which urges the engine to lower the rotation speed thereof. Because a torsion torque acts on the driving wheel as a driving force, the rotation speed of the driving wheel is prevented from lowering significantly even when the brake force applied to the driving wheel increases to a level comparable to the reaction force of the road surface. When the brake force is further increased and the driving wheel starts to decelerate, the conditions for changing the slope or rate at which the braking hydraulic pressure is increased are satisfied. However, at that time point, there is a possibility that the brake force exceeds the reaction force of the road surface. Accordingly, when the control for reducing the brake force is started, the braking hydraulic pressure may have been increased to an excessively high level with the brake force exceeding remarkably the reaction force exerted by the road surface.

SUMMARY OF THE INVENTION

In the light of the state of the art described above, it is a general object of the present invention to provide an anti-lock brake control system for a motor vehicle in which the problems mentioned above are solved satisfactorily.

In particular, it is an object of the present invention to provide an anti-lock brake control system in which a corrected acceleration obtained by correcting a wheel acceleration with a torsion torque taking place in a driving shaft which couples operatively a driving apparatus such as an internal combustion engine to driving wheels is employed for setting a slope or rate at which the braking hydraulic pressure is increased, to thereby preventing the braking hydraulic pressure from increasing excessively.

It is another object of the present invention to provide a method of controlling the braking hydraulic pressure in such a manner as mentioned above, which method can be carried out by using a correspondingly programmed microcomputer or the like.

In view of the above and other objects which will become apparent as the description proceeds, there is provided according to an aspect of the present invention an anti-lock brake control system for a motor vehicle for applying brake to the motor vehicle in safety while avoiding occurrence of a wheel-locked state by repeating operation for lowering a braking hydraulic pressure when a wheel speed decreases upon braking to a level at which the wheel-locked state is likely to occur and increasing again the braking hydraulic pressure when the wheel speed is recovered as a result of the lowering of the braking hydraulic pressure, which system includes a wheel speed detecting means for detecting a rotation speed of each of the wheels of the motor vehicle, a wheel acceleration arithmetic means for arithmetically determining acceleration of the wheel on the basis of the wheel speed obtained by the wheel speed detecting means, a torsion torque detecting means for detecting a torsion torque applied to a driving shaft for operatively connecting each of the wheels to driving means, a corrected acceleration arithmetic means for arithmetically determining a corrected acceleration by correcting the wheel acceleration obtained from the wheel acceleration arithmetic means with the torsion torque obtained by the torsion torque detecting means, a control command means for issuing a command for changing a brake force increasing slope (i.e., a rate at which the brake force is caused to increase) in dependence on status of the wheel acceleration indicating behavior of the wheel and status of the corrected acceleration indicating influence of the torsion torque, respectively, and a brake force regulating means for controlling the brake force in accordance with the command.

With the arrangement of the anti-lock brake control system described above in which the torsion torque applied to the driving shaft is detected and the acceleration of the wheel is corrected with the torsion torque so that the corrected acceleration can be used for controlling the brake application pressure, it is possible to suppress the braking hydraulic pressure from increasing excessively in the initial phase of the brake control by changing optimally the slope or rate at which the braking hydraulic pressure increases at a proper timing, even when vibration or torsion occurs in the driving shaft upon coupling of the driving means such as the engine to the driving wheels by means of a clutch. Thus, a high brake force can be maintained when the motor vehicle is running on a road surface having a high friction coefficient while ensuring in the initial control phase stability for the motor vehicle running on a road surface having a low friction coefficient. Furthermore, yawing of the motor vehicle can be suppressed on a road surface exhibiting different coefficients of friction for left and right wheels, respectively. Besides, by arithmetically determining the torsion torque with a means for detecting the rotation speed (rpm) of the driving apparatus such as an engine or a driving shaft, the anti-lock brake control system can be implemented inexpensively when compared with the system in which torsion torque of the driving shaft is measured by means of the straight gauge known per se.

In a preferred mode for carrying out the invention, the anti-lock brake control system may further include a filtering means for determining arithmetically a second wheel acceleration by eliminating transient variation of the wheel acceleration through a filtering processing. In the case, the control command means can control the brake force by changing the brake force increasing rate or slope when the wheel acceleration is smaller than a predetermined value or when the corrected acceleration is smaller than a predetermined value in the state where the second wheel acceleration is smaller than a predetermined value.

By virtue of arrangement of the anti-lock brake control system described above in which the wheel acceleration undergoes filtering processing for eliminating noise components such as vibration of the wheels brought about by roughness of the road surface, it is possible to change or modify the brake force increasing slope or rate at an optimal timing in consideration of the influence of the torsion torque indicated by the corrected acceleration when the behavior of the wheel indicates sufficient deceleration or when it is detected that the brake force is close to the force of reaction exerted by the road surface. In this way, the braking efficiency can be enhanced.

In another preferred mode for carrying out the invention, the control command means may be so designed as to decrease the brake force increasing slope by holding the brake force when the second wheel acceleration is smaller than a predetermined value with the wheel acceleration being smaller than a predetermined value and when the corrected acceleration is smaller than a predetermined value.

Owing to the arrangement of the anti-lock brake control system described above, it is possible to effect deceleration of the motor vehicle with high efficiency by delaying a timing for reducing the brake force by decreasing or lowering the brake force increasing slope rather than increasing the brake force because large deceleration of the wheel means that the corrected acceleration also decreases significantly and thus an adequate brake force can be applied effectively.

In yet another preferred mode for carrying out the invention, the anti-lock brake control system may further include a vehicle body acceleration calculating means for determining deceleration of the vehicle body. In that case, the control command means can control the brake force by changing the brake force increasing slope in dependence on the status of the vehicle body indicated by the deceleration of the vehicle body, the wheel acceleration indicating behavior of the wheel and the corrected acceleration indicating influence of the torsion torque, respectively.

With the arrangement of the anti-lock brake control system described above, it is possible to adjust the brake force increasing slope or rate by taking into consideration the deceleration of the body of the motor vehicle and hence the change in the load applied to the wheel.

In a further preferred mode for carrying out the invention, the control command means may be so designed as to control the brake force by changing the brake force increasing slope or rate in dependence on detection that a brake force decreasing control is started for at least one of the other wheels than that controlled correctly, the wheel acceleration indicating behavior of the wheel and the corrected acceleration indicating influence of the torsion torque.

With the arrangement of the anti-lock brake control system described above, the increasing rate of the brake force applied to the other wheel upon starting of the brake force lowering control can be mitigated. When one of the left and right wheels is running on a road surface of high friction with the other running on a road surface of low friction, the anti-lock brake control (lowering of the braking hydraulic pressure) is first started for the latter and thereafter for the former. In that case, the brake force applied to the former becomes greater than the brake force applied to the latter, as a result of which the motor vehicle is caused to turn because of the different brake forces applied to the left and right wheels, respectively. However, with the arrangement of the anti-lock brake control system mentioned above, the motor vehicle is protected against forcive turn, whereby a large margin can be assured for manipulatability of the steering wheel or handle.

The invention is further concerned with a method of controlling the brake force in the anti-lock brake control system described above.

Thus, according to another aspect of the invention, there is provided a method of controlling a brake force in an anti-lock brake control system for a motor vehicle for applying brake to the motor vehicle in safety while avoiding occurrence of a wheel-locked state by repeating operation for lowering a braking hydraulic pressure when a wheel speed decreases upon braking to a level at which the wheel-locked state is likely to occur and increasing again the braking hydraulic pressure when the wheel speed is recovered as a result of the lowering of the braking hydraulic pressure, which method includes the steps of detecting a rotation speed of each of the wheels of the motor vehicle, arithmetically determining acceleration of the wheel on the basis of the wheel speed, detecting a torsion torque applied to a driving shaft operatively connecting each of the wheels to driving means, arithmetically determining a corrected acceleration by correcting the wheel acceleration with the torsion torque, issuing a command for changing a brake force increasing slope in dependence on status of the wheel acceleration and status of the corrected acceleration indicating influence of the torsion torque, respectively, and controlling the brake force in accordance with the command.

Since the method mentioned above and others which will become apparent can be prepared as a program stored in a ROM incorporated in a microcomputer so that the method can be executed by the microcomputer, it is contemplated that such microcomputer or memory storing the control method even in the form of a program is to be covered by the present invention.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

General Description

In the first place, the basic concept underlying the invention will be described by referring to FIG. 1.

Figure 1:
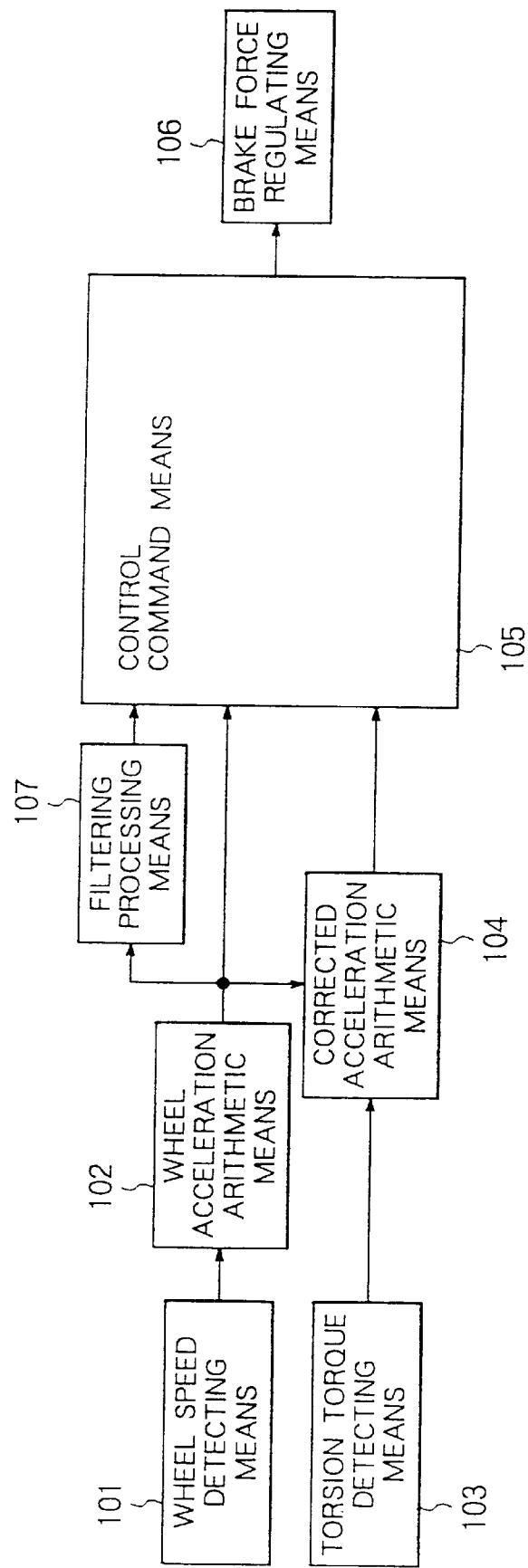
FIG. 1 is a functional block diagram for illustrating the basic concept underlying the anti-lock brake control system according to the present invention.

FIG. 1 is a block diagram showing schematically the basic concept of the present invention. Referring to the figure, the anti-lock brake control system is composed of a wheel speed detecting means 101 for detecting a rotation speed of each of the wheels of a motor vehicle, a wheel acceleration arithmetic means 102 for arithmetically determining acceleration of the wheel on the basis of the wheel speed determined by the wheel speed detecting means 101, a torsion torque detecting means 103 for detecting a torsion torque applied to a drive shaft provided for each of the wheels and operatively coupled to a prime mover such as internal combustion engine or the like, a corrected acceleration arithmetic means 104 for arithmetically determining a corrected acceleration by correcting the wheel acceleration derived from the wheel acceleration arithmetic means 102 with a torsion torque detected by the torsion torque detecting means 103, a control command means 105 for issuing a control command for changing a brake force increasing rate or slope in dependence on the status of the wheel acceleration indicating behavior of the wheel and that of the corrected acceleration indicating the influence of the torsion torque, and a brake force regulating means 106 for controlling the brake force applied to the wheels on the basis of the command mentioned above.

A torsion torque occurring between the driving apparatus such as the engine and the driving wheel(s) operatively connected to the engine via a drive shaft is detected, whereon the wheel acceleration is corrected in consideration of the detected torsion torque to thereby determine a corrected acceleration. The corrected acceleration can be arithmetically determined as follows:

When torsion is applied to the drive shaft for the wheels, the equation of motion of the wheel in which the torsion is taken into consideration can be expressed as follows:

$$Iw \cdot (d\omega/dt) = \mu \cdot W \cdot r - Tb - Tt \quad (1)$$

where
Iw represents the moment of inertia of the wheel,
$\omega$ represents an angular velocity of the wheel,
Tt represents torsion torque,
$\mu$ represents a coefficient of friction of a road surface,
W represents a load imposed on the wheel,
r represents a radius of the wheel, and
Tb represents a brake torque.

Relation between the wheel angular velocity $\omega$ and the wheel acceleration Gw can be expressed as follows:

$$Gw = Kr \cdot (d\omega/dt) \quad (2)$$

where Kr represents a constant. From the expressions (1) and (2), the following expression (3) can be derived.

$$Gc = Gw + (Kr/Iw) \cdot Tt \quad (3)$$

Thus, corrected acceleration Gc can be determined on the basis of the wheel acceleration Gw and the torsion torque Tt in accordance with the above expression (3).

Furthermore, from the expressions (1) and (3), the corrected acceleration Gc can also be expressed as follows:

$$Gc = (Kr/Iw) \cdot (\mu \cdot W \cdot r - Tb) \quad (4)$$

To say in another way, a relation between the tire torque $\mu$Wr determined by the frictional coefficient $\mu$ of the road surface, the reaction force $\mu$W exerted by the road surface in response to the wheel load W and the wheel radius r on one hand and the brake torque Tb generated by the braking hydraulic pressure can be determined on the basis of the corrected acceleration Gc.

Thus, when the torsion torque acts as the driving force (i.e., when Tt<0), the corrected acceleration exhibits a higher deceleration than the wheel acceleration. Accordingly, when the driving wheel is driven under the effect of the torsion torque, the relation between the reaction force of the road surface and the brake force can be known from the corrected acceleration Gc even when the brake force exceeds the reaction force exerted by the road surface, although the influence of the torsion torque to the wheel acceleration is difficult to detect, as is also understood from the expression (4).

According to the present invention, it is proposed to change the slope or rate at which the brake force is increased (hereinafter referred to also as the brake force increasing slope) in dependence on two parameters, i.e., corrected acceleration and wheel acceleration. In other words, even when deceleration of the driving wheel does not make appearance under the effect of the torsion torque acting as the driving force, it is possible to change the brake force increasing slope or rate on the basis of the corrected acceleration.

Now, the present invention will be described in detail in conjunction with what is presently considered as preferred or typical embodiments thereof by reference to the drawings. In the description, like reference characters designate like or corresponding parts throughout the several views.

Embodiment 1

Figure 2:
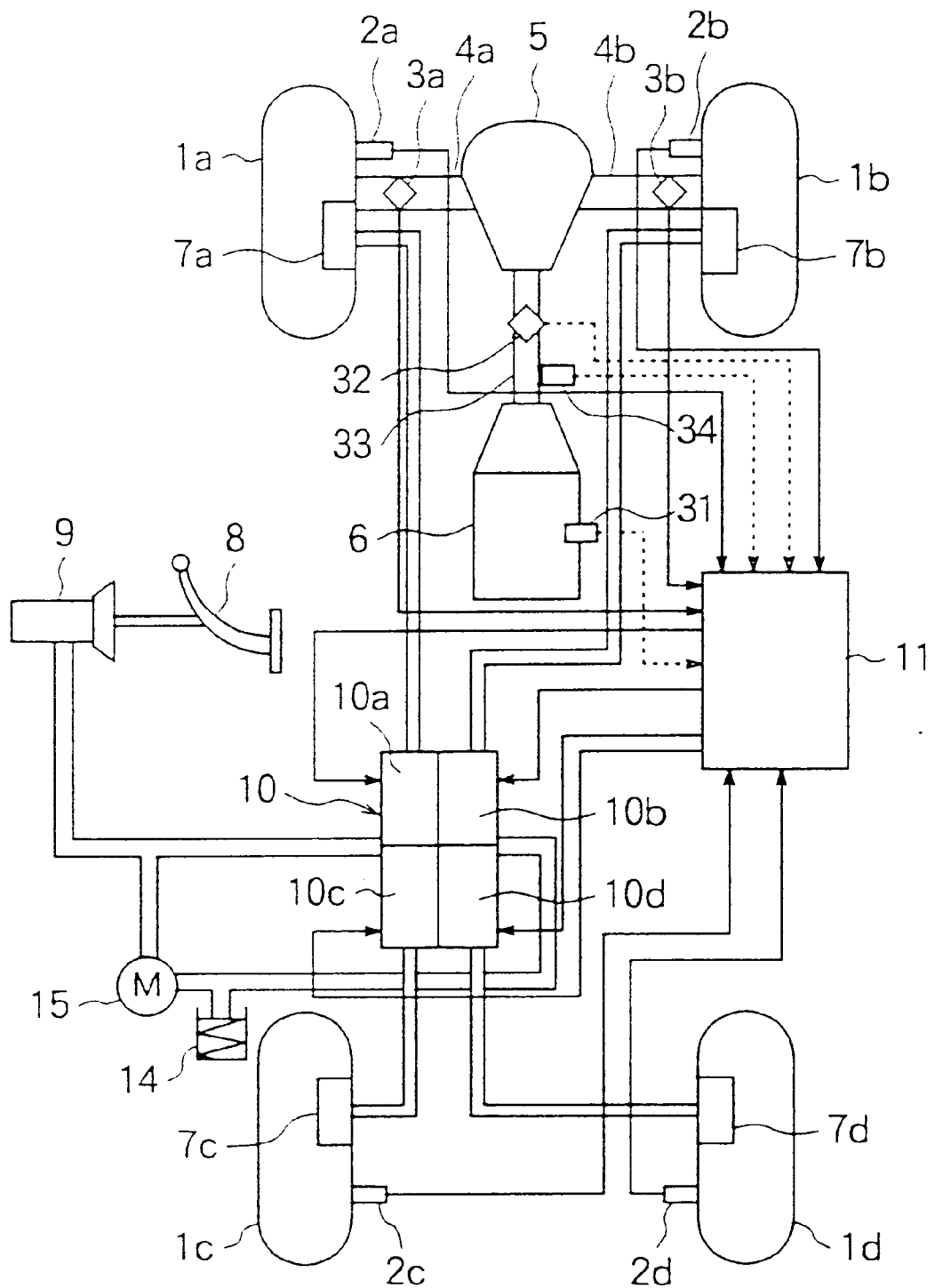
FIG. 2 is a schematic diagram showing a general arrangement of the anti-lock brake control system for a motor vehicle according to an embodiment of the present invention.
Figure 3:
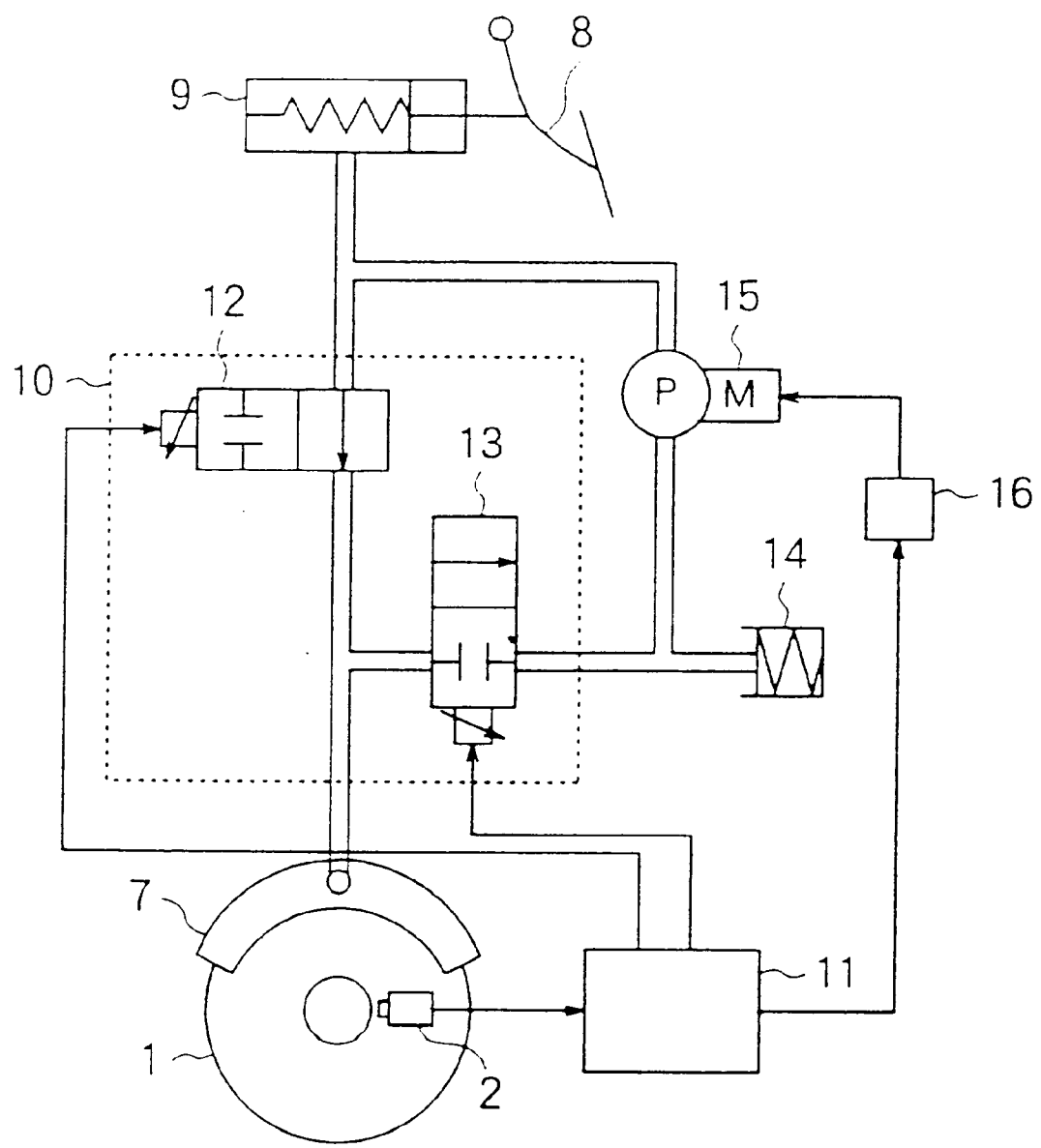
FIG. 3 is a circuit diagram showing a brake regulating means provided in association with a wheel according to an embodiment of the invention.
Figure 4:
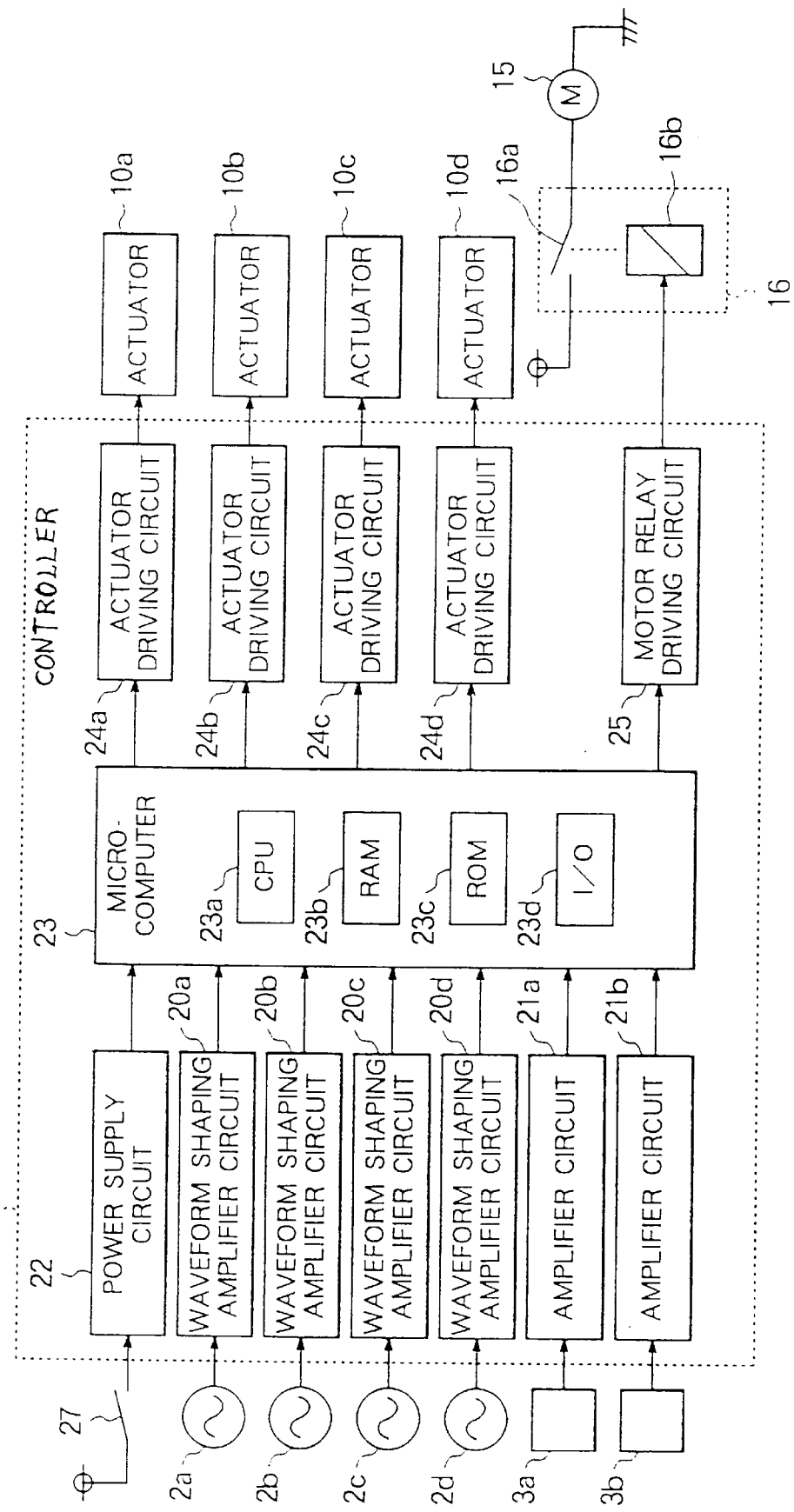
FIG. 4 is a block diagram showing a configuration of a controller employed in the system according to an embodiment of the invention.

An anti-lock brake control system installed on a motor vehicle according to a first embodiment of the present invention will now be described by referring to FIGS. 2 to 4, in which FIG. 2 is a schematic diagram showing a general arrangement of the anti-lock brake control system, FIG. 3 is a diagram showing in detail a structure of an actuator shown in FIG. 2, and FIG. 4 is a block diagram showing in detail a system configuration of a controller shown in FIG. 4.

As shown in FIG. 2, mounted in the vicinity of individual wheels 1a to 1d of the motor vehicle are wheel speed sensors 2a to 2d each of which may be constituted by an electromagnetic pick-up type sensor or photoelectric transducer type sensor known per se. These wheel speed sensor 2a to 2d serve to generate rotation speed signals indicative of the rotation speeds (rpm) of the associated wheels 1a to 1d, respectively. Parenthetically, these wheel speed sensors 2a to 2d cooperate to constitute the wheel speed detecting means 101 mentioned previously.

Of the wheels 1a to 1d, the driving wheels 1a and 1b are operatively coupled to an internal combustion engine (hereinafter simply referred to as the engine) 6 of the motor vehicle by way of axle shafts 4a and 4b, a differential mechanism 5 and a drive shaft 33, wherein the axle shafts 4a and 4b are provided with torque sensors 3a and 3b for detecting torsion torque applied to the axle shafts 4a and 4b, respectively. Parenthetically, the axle shaft (4a, 4b) may also be referred to as the drive shaft. When the motor vehicle of concern is a front-wheel driving type, the front wheels serve as the driving wheels 1a and 1b with the rear wheels serving as the follower wheels 1c and 1d. On the other hand, in the case of a motor vehicle of the rear-wheel driving type, the rear wheels function as the driving wheels 1a and 1b. The torque sensors 3a and 3b are installed in association with the driving wheels.

In more concrete, each of the torque sensors 3a and 3b is constituted as described below. That is, each of the torque sensors is implemented in the form of a bridge-circuit type strain gauge mounted on each of the axle shafts 4a and 4b so that the strain gauge undergoes distortion corresponding to the magnitude of torsion torque applied to the associated axle shaft 4a; 4b, wherein the distortion is detected as a change in the voltage appearing across the terminals of the bridge circuit constituting the strain gauge. The voltage signal derived from the strain gauge is amplified to be sent to a controller 11 via a slip ring or in the form of a radio signal. In this manner, the outputs of the torque sensors 3a and 3b mounted on the axle shafts 4a and 4b can be transmitted to the controller 11. Parenthetically, the torque sensors 3a and 3b cooperates to constitute the torsion torque detecting means 103 mentioned hereinbefore.

Provided in association with the wheels 1a to 1d are braking devices 7a to 7d, respectively, which serve as the braking means.

A master cylinder 9 is operatively connected to a brake pedal 8 by way of a transmitting means such as a rod. When the brake pedal 8 is depressed, a brake application pressure of a magnitude corresponding to the depression stroke of the brake pedal 8 is generated by the master cylinder 9. The brake application pressure generated by the master cylinder 9 is regulated by the actuator means 10 in accordance with the output of the controller 11, as will be described in detail hereinafter, whereupon the brake application pressure is sent to the braking devices 7a to 7d, respectively. The actuator means 10 is constituted by actuators 10a to 10d corresponding to the braking devices 7a to 7d provided in association with the wheels 1a to 1d, respectively. Incidentally, the actuator means 10 constitutes a brake force regulating means.

The controller 11 is designed to receive the signals from the wheel speed sensors 2a to 2d and the torque sensors 3a and 3b for performing arithmetic operations and control processings for the anti-lock brake control on the basis of the signals mentioned above to thereby generate output signals for driving the actuator means 10.

The actuator means 10 is constituted by the actuators 10a to 10d in such a structure as shown in FIG. 3. Since the actuators 10a to 10d constituting the actuator means 10 are realized in a same structure, the description will be directed to the actuator 10a as the representative, being understood that the following description holds essentially true for the other actuators 10b, 10c and 10d.

The actuator 10a includes a pressure-holding solenoid valve 12 installed in a hydraulic pipe extending from the master cylinder 9 to the braking device 7a and a pressure-reducing solenoid valve 13 installed in a hydraulic fluid recovering pipe which extends from the braking device 7a to the master cylinder 9 by way of a reservoir tank 14 and a hydraulic fluid recovery pump 15. Operations of the pressure-holding solenoid valve 12 and the pressure-reducing solenoid valve 13 are effectuated by electrically energizing or deenergizing the solenoids thereof under the control of the controller 11. Further, a reference numeral 16 denotes a motor relay for turning on/off the power supply to an electric motor incorporated in a pump 15 in dependence on the output of the controller 11.

Now, description will turn to the operation of the actuator mans 10. When the brake pedal 8 is depressed, a hydraulic pressure is applied to the master cylinder 9, as a result of which a brake fluid or oil flows from the master cylinder 9 into the braking device 7a, . . , 7d by way of the pressure-holding solenoid valve 12 of the actuator 10a . . , 10d, whereby the brake application pressure within the braking device 7a, . . , 7d is caused to increase.

When a pressure-reducing signal is outputted from the controller 11, the pressure-holding solenoid valve 12 and the pressure-reducing solenoid valve 13 are electrically energized, which results in that the brake fluid passage extending between the master cylinder 9 and the braking device 7a, . . , 7d is interrupted or closed, whereas a brake fluid passage between the braking device 7a, . . , 7d and the reservoir tank 14 is opened. Consequently, the braking hydraulic pressure within the braking device 7a, . . , 7d is released to the reservoir tank 14, whereby the brake application pressure is lowered. At the same time, the motor relay 16 is closed to put into operation the motor of the hydraulic fluid recovery pump 15. As a result of this, the hydraulic pressure within the reservoir tank 14 is increased. The hydraulic fluid within the reservoir tank 14 is thus fed back to the master cylinder 9 in preparation for the succeeding control with the brake application pressure being held.

Thereafter, when a hold signal is outputted from the controller 11, only the pressure-holding solenoid valve 12 is electrically energized, whereby all the braking hydraulic pressure paths are interrupted.

On the other hand, when a pressure-increase command signal is issued from the controller 11, the electric currents supplied to the pressure-holding solenoid valve 12 and the pressure-reducing solenoid valve 13 are interrupted, which results in that the hydraulic paths between the master cylinder 9 and the braking device 7a, . . , 7d are again established. As a consequence, the high-pressure brake fluid fed back to the master cylinder 9 as well as the brake fluid discharged from the hydraulic fluid recovery pump 15 is caused to flow into the braking device 7a, . . , 7d, whereby the brake application pressure is increased.

As will now be appreciated from the above, the brake application pressure is regulated by repeating the pressure reducing operation, the pressure holding operation and the pressure increasing operation in accordance with the commands issued from the controller 11. In this way, the wheels of the motor vehicle are protected against being locked.

The controller 11 is implemented in such a circuit configuration as shown in FIG. 4. Referring to FIG. 4, the controller 11 includes waveform shaping circuits 20a, 20b, 20c and 20d which serve for shaping the output signals of the wheel speed sensors 2a, 2b, 2c and 2d into signal pulses suitable for the processings executed by a microcomputer 23, amplifier circuits 21a and 21b for converting the output signals of the torque sensor 3a and 3b into digital signals suited for the processings executed by the microcomputer 23, and a power supply circuit 22 for supplying a predetermined constant voltage to the microcomputer 23 when an ignition switch 27 is turned on. The microcomputer 23 includes a CPU (Central Processing Unit) 23a, a RAM (Random Access Memory) 23b, a ROM (Read-Only Memory) 23c, an input/output interface 23d and others. Further, the controller 11 includes actuator driving circuits 24a, 24b, 24c and 24d which output driving signals for driving the actuators 10a, 10b, 10c and 10d, respectively, in response to relevant control signals outputted from the microcomputer 23, and a driving circuit 25 for electrically energizing a coil 16b of the motor relay 16 to thereby close a normally opened contact 16a of the relay 16.

Figure 5:
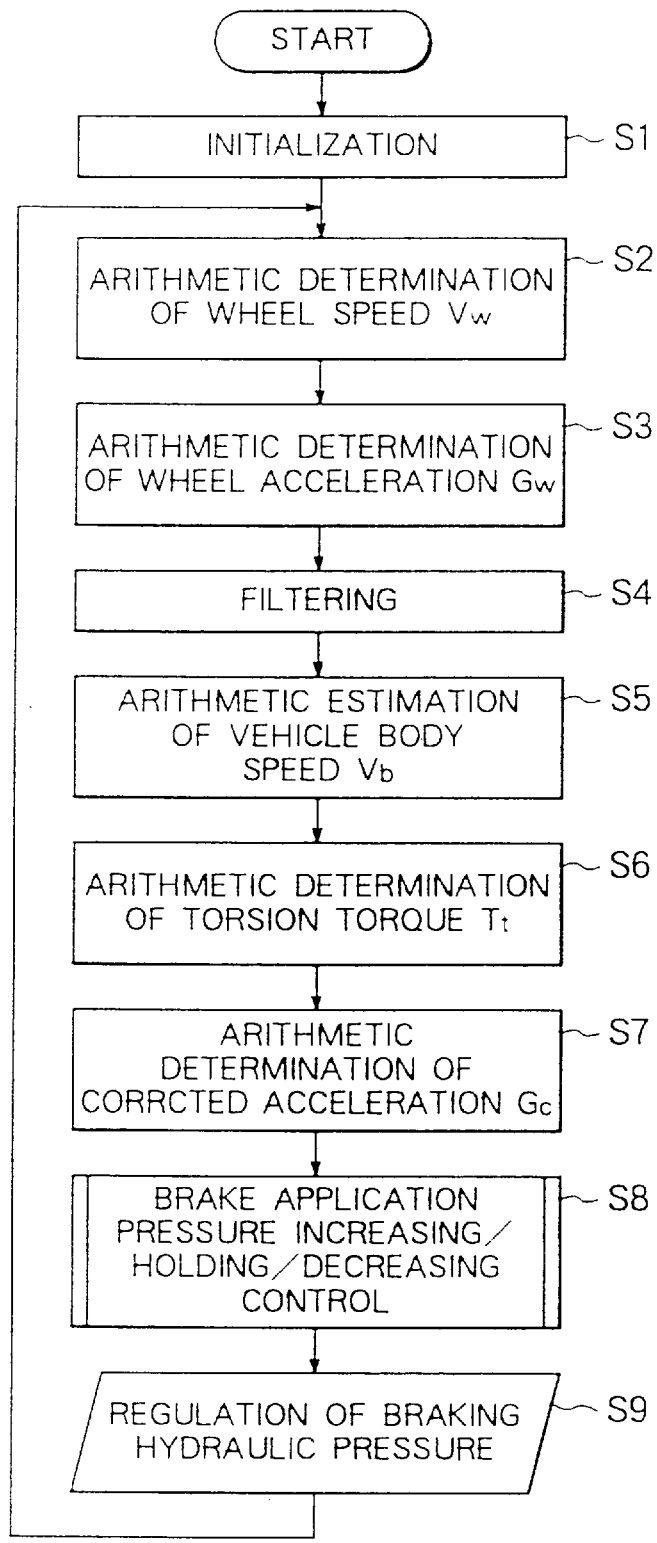
FIG. 5 is a flow chart for illustrating a flow of processings executed by a microcomputer incorporated in the controller according to an embodiment of the invention.
Figure 6:
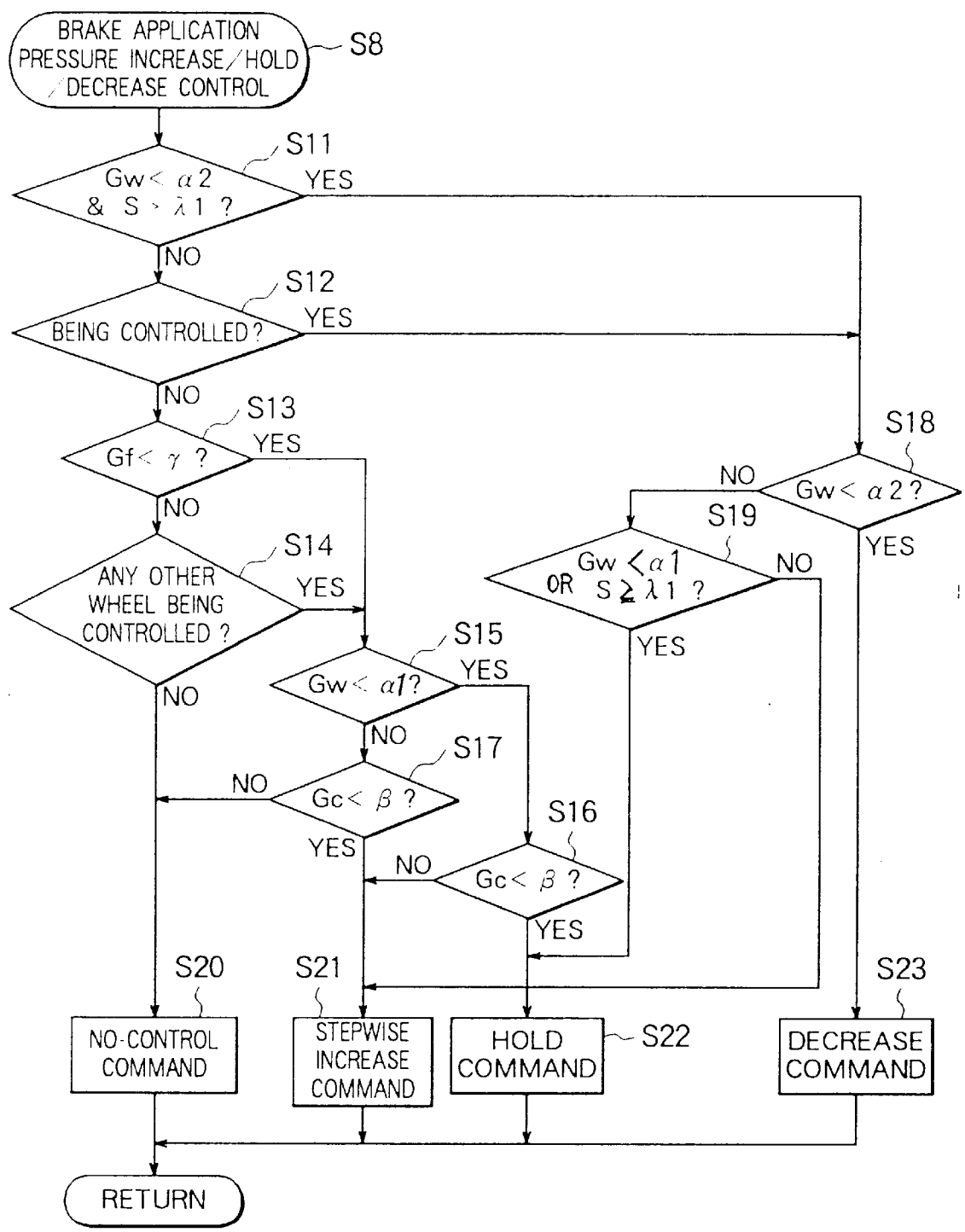
FIG. 6 is a flow chart for illustrating generally a flow of brake application pressure control processes according to an embodiment of the invention.

Next, referring to flow charts shown in FIGS. 5 and 6, description will be directed to the operations of the microcomputer 23 incorporated in the controller 11 of the structure described above. At first, general processing flow will be explained by reference to FIG. 5. In a step S1, initialization of the RAM 23b and the input/output interface 23d is performed.

Subsequently, the wheel speed Vw is arithmetically determined in a step S2. More specifically, upon reception of the pulse signals having the pulse frequencies indicative of the rotation speeds of the individual wheels 1a, . . , 1d from the waveform shaping amplifier circuits 20a, . . , 20d, the microcomputer 23 starts the wheel speed arithmetic processing (step S2) and starts in succession the counting of the pulse number Pn for the purpose of measuring the time lapse Tn from the start of the pulse counting operation. On the basis of the value of the count value Pn and the time lapse Tn thus obtained, the wheel speed Vw is calculated in accordance with the following expression (5):

$$Vw = Kv \cdot (Pn/Tn) \quad (5)$$

where Kv represents a constant which can be determined in consideration of the diameter of the wheel, characteristics of the wheel speed sensor 2 and other factors. At this juncture, it should be mentioned that the above-mentioned process for determining the wheel speed Vw is only by way of example, and other method may be resorted to.

In a succeeding step S3, the wheel acceleration Gw is arithmetically determined on the basis of the wheel speed Vw determined in the step S2. To this end, a difference between the wheel speed Vw determined in the step S2 during the currently executed processing period TL on one hand and the wheel speed Vw1 determined in the corresponding step S2 in the immediately preceding processing period on the other hand is determined, whereon the wheel acceleration Gw is arithmetically determined on the basis of the difference mentioned above and the period TL in accordance with the following expression (9):

$$Gw = Kg \cdot (Vw - Vw1)/TL \qquad (6)$$

where Kg represents a constant. The wheel acceleration Gw indicates that the wheel rotation is being accelerated when the wheel acceleration Gw is of a plus sign (i.e., when Gw>0 (zero)), while the wheel acceleration Gw of minus sign (i.e., Gw<0) indicates that the wheel speed is being decelerated.

In a step S4, a filtering processing of the wheel acceleration Gw is performed to determine a second wheel acceleration Gf. The second wheel acceleration Gf resulting from the filter processing represents a corrected wheel acceleration from which vibration of the wheel due to undulation or roughness of the road surface is suppressed or eliminated.

In a step S5, an estimated vehicle body speed Vb is determined on the basis of the wheel speed Vw of the wheel 1a, ..., 1d. As an estimating method to this end, the greatest one of the values derived by decreasing the vehicle body speed Vb1 obtained one control period before at a gradient or rate of −1 g and the highest one of the wheel speeds Vw of the four wheels 1a to 1d may be selected as the estimated vehicle body speed Vb. Further, slip can be determined by calculating a difference between the estimated vehicle body speed Vb and the wheel speed Vw.

In a step S6, a torsion torque Tt is determined. More specifically, the voltage signals outputted from the torque sensors 3a and 3b mounted on the axle shafts 4a and 4b, respectively, are inputted to the microcomputer 23 after having been amplified by the amplifier circuits 21a and 21b, respectively. On the basis of digital values obtained after A/D conversion (analogue to digital conversion) of these input signals, the torsion torque Tt is arithmetically determined by the microcomputer 23.

In a step S7, the corrected acceleration Gc is arithmetically determined on the basis of the wheel acceleration Gw and the torsion torque Tt in accordance with the expression (3) mentioned hereinbefore. Namely, $$Gc = Gw + (Kr/Iw) \cdot Tt \qquad (3)$$

In a processing step S8, the brake application pressure is controlled by issuing the hydraulic pressure decreasing, holding or increasing command. The processing in this step S7 will be elucidated in detail later on.

In a step S9, signals are supplied from the controller 11 to the actuator 10a, ..., 10d on the basis of the command determined in the step S8, whereon the brake application pressure increasing/holding/decreasing control processing is performed. Because the actuator 10a, ..., 10d has only the three operation modes, i.e., the braking hydraulic pressure decreasing mode, the braking hydraulic pressure holding mode and the braking hydraulic pressure increasing mode, the braking hydraulic pressure holding signal is periodically interposed intermittently in the braking hydraulic pressure increasing signal in order to suppress the gain for increasing the braking hydraulic pressure when the brake application pressure is to be increased gradually or stepwise, i.e., with a smaller gain, to thereby increase progressively or stepwise the hydraulic pressure. Similar control may equally be adopted for decreasing gradually or stepwise the brake application pressure.

After execution of the processing steps mentioned above, the step S2 is resumed when the control period of a predetermined time duration has lapsed. This processing procedure is repeated until the ignition switch 27 is opened.

Now, the brake application pressure increasing/holding/decreasing control step S8 will be described by reference to a flow chart shown in FIG. 6.

Referring to FIG. 6, in a step S11, decision is made as to whether or not the conditions for the ordinary anti-lock brake control for decreasing, holding or increasing the braking hydraulic pressure are met. More specifically, when magnitude of the slip S is greater than a predetermined value $\lambda 1$ and when the wheel acceleration Gw is smaller than a predetermined value $\alpha 2$, it is decided that the brake control is to be started, whereon the processing proceeds to a step S18. If otherwise, the processing proceeds to the step S12.

In the step S12, it is decided whether or not the anti-lock brake control is being effectuated. If so (YES), the processing proceeds to the step S18. If otherwise (NO), the processing proceeds to a step S13. In this way, the ordinary anti-lock brake control and the control for changing the brake force increasing slope taught by the present invention are separated, wherein in the ordinary anti-lock brake control, the processing steps S18 et seq. are executed.

In the step S13, decision is made as to whether or not the second wheel acceleration Gf obtained from the filtering processing is smaller than a predetermined value y. When the second wheel acceleration Gf is smaller than the predetermined value y, the processing proceeds to a step S15, while proceeding to a step S14, if otherwise. This decision step S13 is provided for the purpose of preventing the control for changing the brake application pressure increasing slope from being started in response to transient vibration of the wheel brought about by roughness of the road surface so that the brake application pressure increasing slope changing control is performed only in the state in which deceleration of the wheel is taking place stably, i.e., the brake force of adequately large magnitude is acting.

In the step S14, it is decided whether or not any one of the wheels is being under the anti-lock brake control. If so (YES), the processing proceeds to the step S15. If otherwise (NO), the processing proceeds to a step S20. In conjunction with this decision step S14, it is noted that when the motor vehicle is running on a road surface exhibiting different friction coefficients for left and right wheels, respectively, controlling of the brake forces for these wheels in conformance with the different friction coefficients will bring about a large difference in the applied brake force between the left and right wheels, as a result of which the vehicle body is subjected to a large yawing moment. Such yawing of the vehicle body can be suppressed by increasing only gradually the brake force for the wheel running at the road side having greater friction coefficient. Additionally, it is noted that in the situation mentioned above, the point for changing the brake force increasing slope for the wheel running at the road side having smaller friction coefficient can not be determined on the basis of the corrected acceleration and the wheel acceleration given by the relation between the reaction force of the road surface exerted to the wheel and the brake force applied thereto. Accordingly, in this case, it is decided whether or not any one of the other three wheels is being subjected to the anti-lock brake control (brake application pressure lowering control).

When it is decided in the step S15 that the wheel acceleration Gw is smaller than a predetermined value α1 (YES), the processing proceeds to a step S16 and, if otherwise (NO), to a step S17.

When it is decided in the step S16 that the corrected acceleration Gc is smaller than a predetermined value β, the processing proceeds to a step S22 for holding the braking hydraulic pressure. On the other hand, when the corrected acceleration Gc is not smaller than the predetermined value β, a processing step S21 is executed to issue a command for gradual or stepwise increasing of the braking hydraulic pressure. More specifically, when the corrected acceleration Gc is smaller than the predetermined value β, this means that the wheel is decelerating at high rate with the corrected acceleration Gc decreasing as well. In other words, the brake force of appropriate magnitude is acting. Accordingly, by holding the current brake force to thereby delay the timing for lowering the brake force, it is possible to increase the deceleration of the vehicle body. Further, unless the corrected acceleration Gc decreases notwithstanding of the steep deceleration of the wheel acceleration Gw, this means that the rotation speed of the wheel lowers rapidly. Accordingly, the braking hydraulic pressure increasing slope is changed before the slip increases so that the brake force changes gently, to thereby prevent the slip from increasing steeply while ensuring stability of the vehicle body.

When it is decided in the step S17 that the corrected acceleration Gc is smaller than the predetermined value β, then the processing step S21 is executed to issue a command for increasing stepwise or gradually the braking hydraulic pressure, whereon the control for holding the braking hydraulic pressure and the control for increasing the braking hydraulic pressure are repeated periodically. On the other hand, when the corrected acceleration Gc is not smaller than the predetermined value β, no valve control is performed with the increased braking hydraulic pressure being maintained so that the brake force is generated in dependence on the depression stroke of the brake pedal. When the wheel speed starts to decrease rapidly, torsion takes place in the driving shaft and acts on the wheel as a driving force. Consequently, the wheel acceleration Gw is prevented from lowering significantly. In that case, it is impossible to make decision with the wheel acceleration Gw whether or not the brake force is adequate in view of the reaction force of the road surface. Accordingly, the corrected acceleration Gc is used for making this decision. At this juncture, it should be added that by changing appropriately the brake force increasing slope (i.e., rate at which the brake increases), the brake force can be suppressed from increasing excessively in the initial or starting phase of the brake force control.

In the step S18, the ordinary anti-lock brake control is performed. More specifically, when the wheel acceleration Gw is smaller than a predetermined value α2, it is decided that the wheel tends to be locked. Accordingly, a command for reducing the braking hydraulic pressure is issued in a step S23. By reducing the brake force, thesuppressed, whereby the wsuppressed, whereby the wheel speed can be restored to the vehicle body speed.

When it is decided in the step S18 that the wheel acceleration Gw is not smaller than the predetermined value α2, then a decision step S19 is executed. When it is decided in the step S19 that the slip S is equal to or greater than the predetermined value λ1 or that the wheel acceleration Gw is smaller than a predetermined value α1, this means that the wheel lock tendency is suppressed. Accordingly, the processing proceeds to a step S22 where the command for holding the braking hydraulic pressure is issued, whereon restoration of the wheel speed Vw close to the vehicle body speed Vb is waited for. On the other hand, when the slip S is smaller than the predetermined value λ1 and when the wheel acceleration Gw is not smaller than the predetermined value α1, the processing proceeds to a step S21 where the command for increasing gradually the braking hydraulic pressure is issued. Subsequently, restoration of the wheel speed Vw close to the vehicle body speed Vb is waited for, whereon the brake force is gradually increased when the wheel speed Vw has been restored to the vehicle body speed Vb.

In the step S21, the braking hydraulic pressure is increased gently or stepwise to thereby increase the brake force correspondingly. When the brake force exceeds the reaction force exerted by the road surface, the wheel tends to be locked. Accordingly, the braking hydraulic pressure decreasing command is issued. The braking hydraulic pressure control cycle including the pressure decreasing, holding and increasing steps is continued repetitively until the wheel lock tendency is suppressed.

The anti-lock brake control processing described above is executed for each of the brake devices provided in association with the individual wheels, respectively. In this conjunction, it is noted that in the anti-lock brake control for the driving wheels 1a and 1b, the wheel acceleration is corrected with the torsion torque, whereon the brake application pressure increasing/holding/decreasing control is performed for the braking device 7a, 7b associated with the driving wheel 1a, 1b. However, in the case of the follower wheels (i.e., non-driving wheels) 1c and 1d, no torsion torque occurs in the associated axle shafts, differing from those for the driving wheels 1a and 1b. Accordingly, in the anti-lock brake control for the follower or non-driving wheels 1c and 1d, the torsion torque Tt is set equal to zero, and the same control processing as those for the driving wheels 1a and 1b is executed. Further, when the power transmission from the engine 6 to the driving wheels 1a and 1b is interrupted by manipulating the clutch, the inertia of the engine 6 does not act on the driving wheels 1a and 1b, which in turn means that substantially no torsion torque occurs in the associated axle shafts. Accordingly, in the state where the driving wheels 1a and 1b are operatively disconnected from the engine 6, the anti-lock brake control processing is executed on the presumption that the torsion torque Tt is equal to zero.

Figure 7:
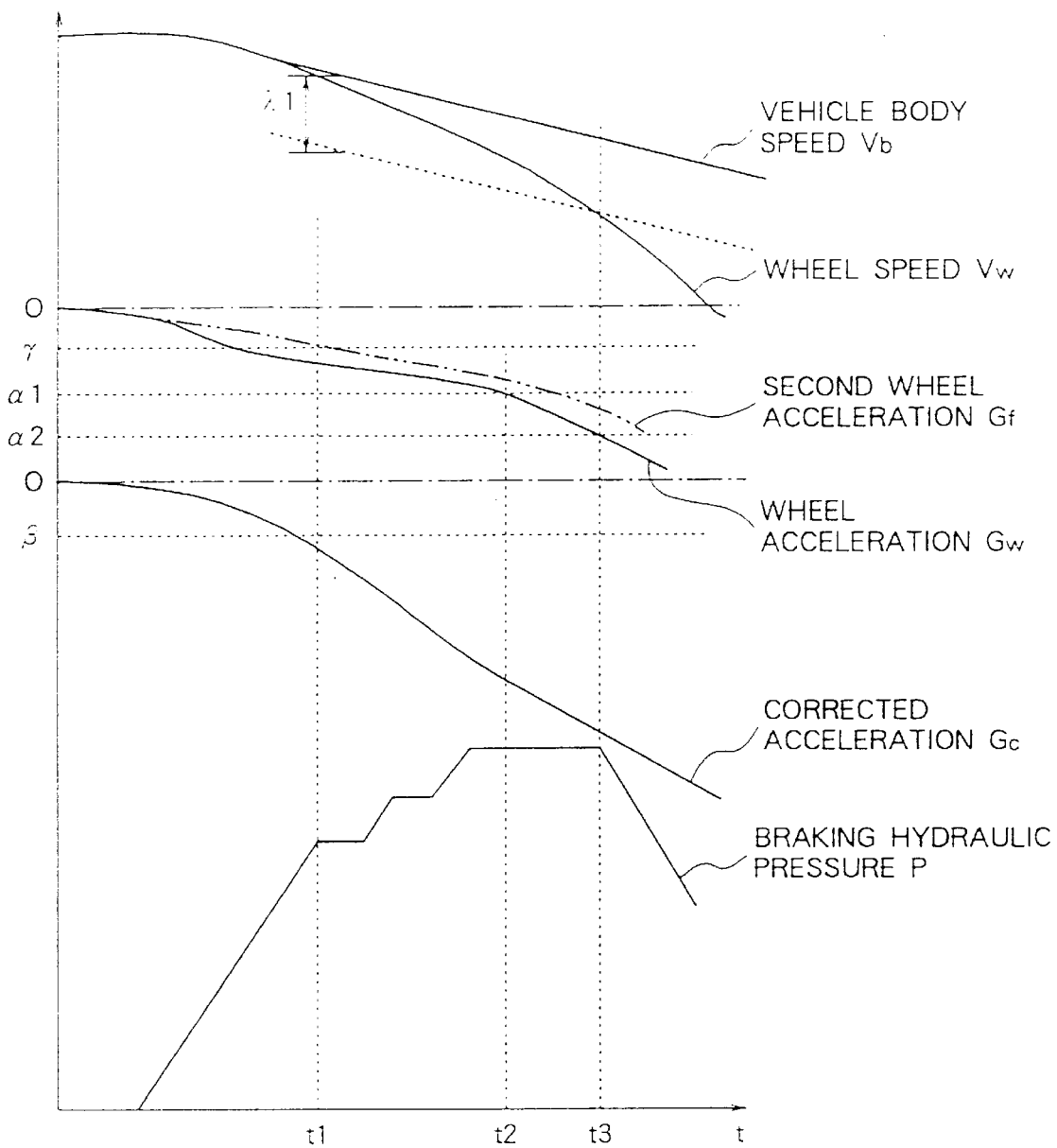
FIG. 7 is a waveform diagram for graphically illustrating brake force control procedure according to an embodiment of the invention together.

Next, operations of the brake control system effected upon execution of the aforementioned processing will be described by reference to FIGS. 7 and 8, in which FIG. 7 is a waveform diagram for illustrating behaviors of the vehicle body speed Vb, wheel speed Vw, the wheel acceleration Gw, the second wheel acceleration Gf, the corrected acceleration Gc and the braking hydraulic pressure P, respectively. Referring to FIG. 7, when the braking hydraulic pressure P increases steeply, the wheel speed Vw starts to lower rapidly. However, because the torsion torque acts as a driving force, deceleration of the wheel is suppressed. By contrast, the corrected acceleration Gc decreases gradually under the action of the torsion torque and may decrease below the predetermined value β. In succession, when the second wheel acceleration Gf becomes lower than the predetermined value y at a time point t1, the actuator 10a, . . . , 10d is driven, while the hold command is issued repetitively and periodically to thereby change the slope at which the braking hydraulic pressure is increased.

When braking hydraulic pressure is further increased, the wheel acceleration Gw becomes lower than the predetermined value α1 at a time point t2. Thus, the conditions for holding the braking hydraulic pressure are satisfied by the wheel acceleration Gw and the corrected acceleration Gc, and thus a command for holding the braking hydraulic pressure P is issued. In this way, the braking hydraulic pressure P can be held at an appropriate level, whereby possibility of the brake force increasing excessively in the initial braking phase can be excluded.

Subsequently, when the wheel speed Vw lowers to a level where the slip S increases beyond the predetermined value λ1 (difference between the vehicle body speed Vb and the wheel speed Vw) at a time point t3, this means that the wheel tends to be locked. Accordingly, a command for lowering the braking hydraulic pressure is issued, whereupon the anti-lock brake control (decreasing of the braking hydraulic pressure) is started.

Figure 8:
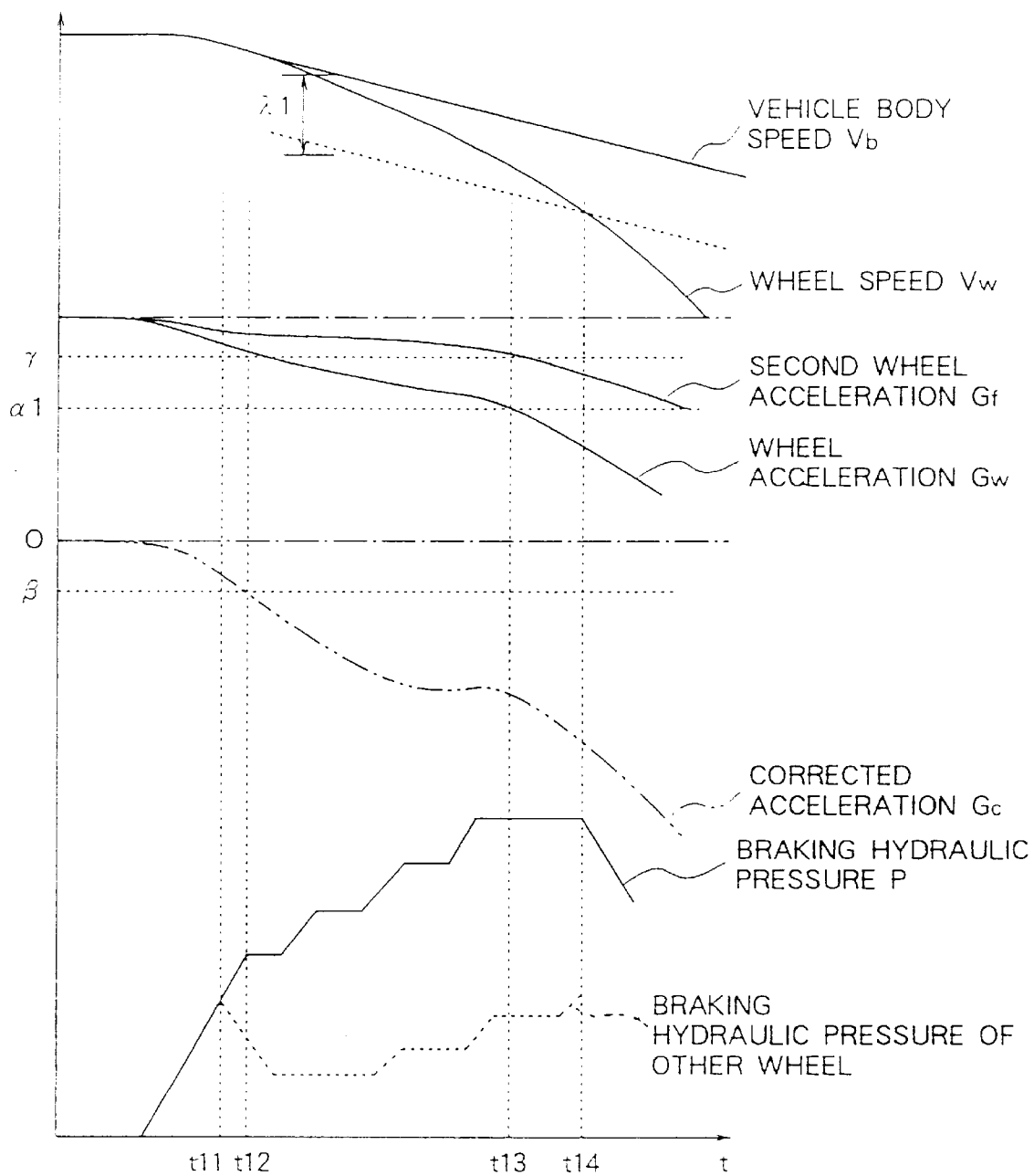
FIG. 8 is a waveform diagram for graphically illustrating brake force control procedure according to another embodiment of the invention.
Figure 9:
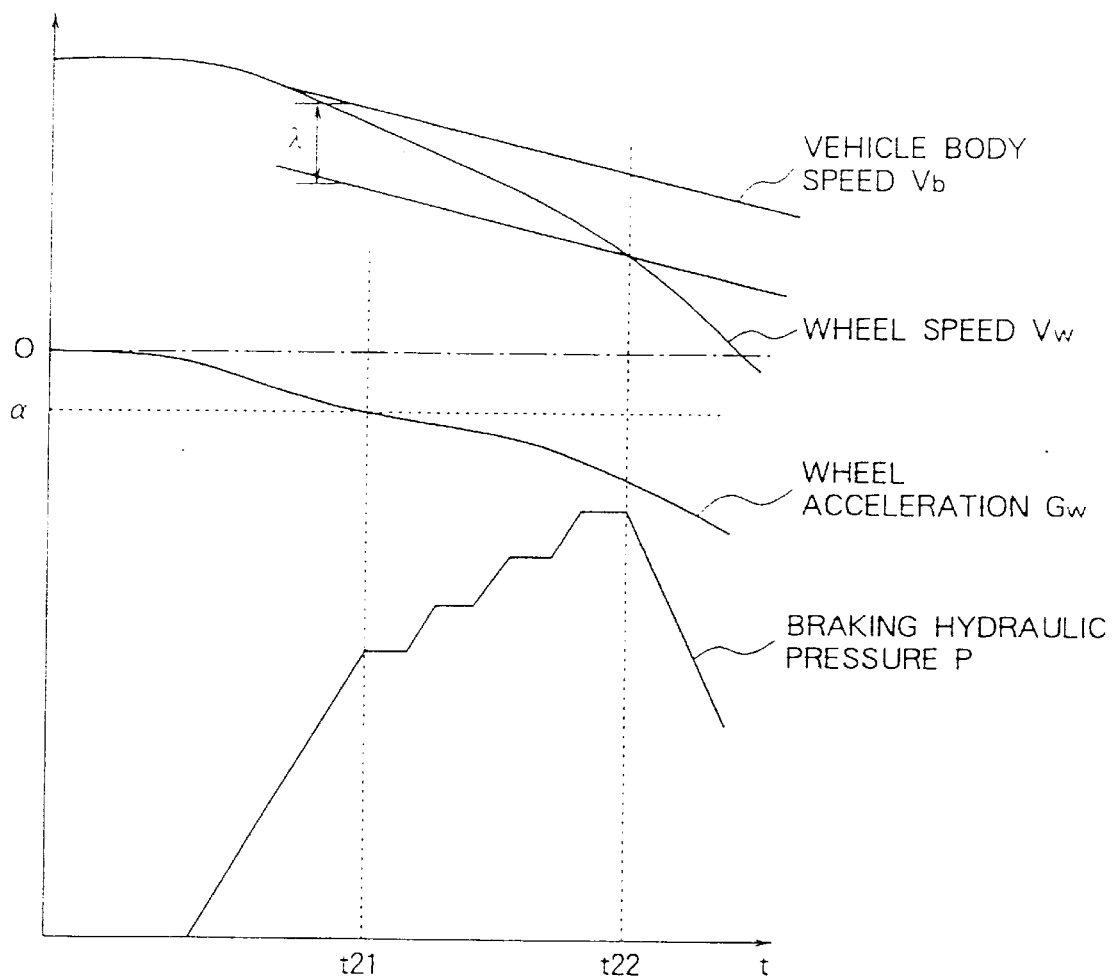
FIG. 9 is a waveform diagram for graphically illustrating a conventional brake force control procedure known heretofore.

FIG. 8 is a timing chart similar to FIG. 7 for illustrating a series of controls in the case where the anti-lock brake control (lowering of the braking hydraulic pressure) is first started for any of the other wheels.

The braking hydraulic pressure is increased, whereby the anti-lock brake control is started for any of the other three wheels at a time point t11.

Subsequently, when the corrected acceleration Gc becomes lower than the predetermined value β at a time point t12, a command is issued for increasing stepwise the braking hydraulic pressure with the slope therefor being changed. At that time point, the second wheel acceleration Gf does not reach the predetermined value y yet. However, at the time point t11, the braking hydraulic pressure increasing slope can be changed because the anti-lock brake control has been started for the other wheel. In this manner, increasing of the brake force for the wheel running at the road side having a higher friction coefficient is obviated, whereby application of yawing moment to the motor vehicle can be suppressed.

At a time point t13 where the wheel acceleration Gw lowers below the predetermined value α1, the braking hydraulic pressure hold control is validated. Thereafter, when the slip S exceeds the threshold value λ1 at a time point t14, the braking hydraulic pressure is decreased, whereupon the anti-lock brake control is started.

Embodiment 2

In the case of the anti-lock brake control system according to the first embodiment of the invention, the second wheel acceleration Gf obtained by filtering the signal representing the wheel acceleration Gw is used for the purpose of inhibiting the control for changing the braking hydraulic pressure increasing slope in response to noise components contained in the wheel acceleration Gw as brought about by vibration of the wheel due to roughness of the road surface. Instead, it is determined whether the brake control with high brake force is to be performed or not.

However, in place of using the second wheel acceleration Gf, acceleration of the vehicle body may be used substantially to the same effect, because the acceleration of the vehicle body is essentially insusceptible to the influence of the noise component mentioned above. Furthermore, by using the acceleration of the vehicle body, it is possible to detect variation in the load applied to the wheel, whereby the brake force can be adjusted optimally even in the course of the load shifting from the vehicle body to the wheel. Thus, the reaction force of the road surface can be increased under the effect of the load shift.

Thus, in the anti-lock brake control system according to the second embodiment of the present invention, the deceleration Gb of the vehicle body is used in the step S13 shown in FIG. 6 and decision is made as to whether or not the deceleration Gb of the vehicle body is smaller than the predetermined value y. If so (YES), the processing proceeds to the step S15 and, if otherwise (NO), to the step S14. In this conjunction, the deceleration Gb of the vehicle body can be determined by arithmetically determining the rate of change of the vehicle body speed Vb estimated from the wheel speed Vw. More specifically, difference is determined between the vehicle body speed Vb calculated currently in the vehicle body speed estimating step S5 shown in FIG. 5 and the value of the vehicle body speed Vb determined in the immediately preceding cycle, whereupon the deceleration Gb of the vehicle body is calculated in accordance with the following expression (7):

$$Gb = Kg \cdot (Vb - Vb1) \qquad (7)$$

At this juncture, it should be mentioned that the deceleration Gb of the vehicle body may also be determined on the basis of a detection signal outputted from a sensor designed for detecting the acceleration of the vehicle body in the longitudinal direction thereof.

Embodiment 3

In the anti-lock brake control systems according to the first and second embodiments of the invention described above, the torsion torque is determined on the basis of the outputs of the torque sensors 3a and 3b implemented in the form of the strain gauges mounted on the axle shafts 4a and 4b, respectively, which are operatively coupled to the individual driving wheels 1a and 1b. It should however be mentioned that when the driving wheels 1a and 1b are operatively coupled to the engine 6 by way of a differential mechanism 5, similar advantageous effects as those of the anti-lock brake control systems according to the first embodiment of the invention can be obtained by mounting a torsion torque detecting sensor 32 on a drive shaft 33 such as a propeller shaft or the like in the structure shown in FIG. 2.

The left and right wheels coupled operatively to each other via the differential mechanism are applied with the torsion torque of a same magnitude. In other words, the torsion torques applied to the left and right wheels, respectively, are equal to each other. Thus, by detecting the torque applied to the drive shaft 33 coupling the engine and the differential mechanism to each other, the torsion torques applied to the left and right wheels can be determined by detecting the torque applied to the drive shaft 33. In that case, the torsion torque applied to each of the left and right wheels has a value equal to a half of the torque applied to the drive shaft 33. Parenthetically, the drive shaft 33 may also be referred to as the driving shaft as in the case of the axle shaft 4.

Embodiment 4

In the anti-lock brake control system according to the first and second embodiments of the invention, the torsion torque is determined on the basis of the output signals from the torque sensors 3a and 3b constituted by strain gauges mounted on the axle shafts 4a and 4b, respectively, which are coupled operatively to the individual driving wheels 1a and 1b or alternatively from the torque sensor 32 mounted on the drive shaft 33. However, the torque of concern can equally be detected by detecting the rotation speed or number (rpm) of the prime mover such as the engine 6. This concept of the invention is incarnated in a third embodiment now under consideration. In the structure of the motor vehicle shown in FIG. 2, the rotation number (rpm) of the engine is detected by the engine rotation sensor 31 which may be constituted by a crank angle sensor known per se. Since the driving wheels 1a and 1b and the engine 6 are operatively coupled through the medium of the differential mechanism 5, the torques applied to the left and right driving wheels are of same magnitude. Accordingly, by detecting a phase relation between the rotation angle of the driving wheel 1a, 1b and that of the engine 6 to thereby determine the phase difference, it is possible to calculate the torsion angle and hence the torsion torque which is proportional to the torsion angle.

More specifically, the rotation angle of the engine 6 is determined on the basis of the output signal from the engine rotation sensor 31, while the rotation angles of the driving wheels 1a and 1b are detected by the wheel speed sensors 2a and 2b, respectively. At a time point at which the torsion torque is of small magnitude with the load of the engine being small, e.g. when the control of the brake application pressure is not yet started, the rotation angles of the driving wheels 1a and 1b and the engine are reset to zero, assuming that there is no phase difference between the driving wheel 1a, 1b and the engine 6. Upon starting of the control of the brake application, the pulses derived from the outputs of the sensors for the driving wheels 1a and 1b and the engine 6 are counted, respectively. On the basis of the count values, the rotation angles θr and θl of the driving wheels 1a and 1b and the rotation angle θe of the engine 6 are determined according to a method known per se, whereupon the torsion angle θt is determined in accordance with the following expression (8):

$$\theta t = Ki \cdot \theta e - (\theta r + \theta l)/2 \quad (8)$$

Thus, the torsion torque Tt can be determined as a product of the torsion angle θt and rigidity Kp of the drive shaft 33 as follows:

$$Tt = Kp \cdot \theta t \quad (9)$$

The torsion torque Tt applied to the left and right driving wheel 1a, 1b is equally applied to the engine 6. When the acceleration pedal 8 is released in the operation state where the anti-lock brake control system (ABS) is operating, the output torque of the engine 6 becomes smaller. In that case, the engine 6 may be regarded as an object exhibiting a great inertia. Accordingly, by detecting the change in the rotation number (rpm) ωe of the engine 6 itself, it is possible to determine the torsion torque applied to the driving wheels 1a and 1b in accordance with the following expression (10):

$$Tt = K(d\omega e/dt) \quad (10)$$

As is apparent from the above, the torsion torque can be arithmetically determined on the basis of the rotation angles of the driving wheels 1a and 1b and that of the engine 6 or on the basis of the change in the rotation speed of the engine 6 as brought about by the torque applied to the driving wheels 1a and 1b and hence to the engine. The torsion torque determined in this way can be made use of in the anti-lock brake control system according to the preceding embodiments, substantially to the same effect.

Embodiment 5

In the anti-lock brake control system according to the fourth embodiment of the invention mentioned above, the rotation number ωe of the engine 6 is detected. However, in place of detecting the engine rotation speed, that of the drive shaft 33 shown in FIG. 2 may be detected. In particular, in the motor vehicle equipped with an automatic transmission, the driving wheels 1a and 1b are operatively coupled to the engine 6 through the medium of a torque converter. To say in another way, the driving wheels 1a and 1b are not directly connected to the engine 6, which in turn means that torque is scarcely transmitted from the driving wheels 1a and 1b to the engine 6. In that case, the rotation number (rpm) of the drive shaft 33 may preferably be detected by a shaft rotation sensor 34 to thereby determine the torsion torque through the procedure described above in conjunction with the fourth embodiment of the invention, substantially to the same effect.

Embodiment 6

In the anti-lock brake control systems according to the first and second embodiments of the invention described above, it has been assumed that the motor vehicle of concern is of a two-wheel driven type. It should however be mentioned that the anti-lock brake control system can equally be applied to a four-wheel driven type motor vehicle for controlling the brake application pressure. More specifically, a strain gauge may be provided in association with the axle shafts of the four wheels, respectively, wherein the processing similar to those described hereinbefore may be performed for each of the wheels, substantially to the same effect.

Furthermore, when the torsion of the drive shaft is to be detected in the structure in which the differential mechanisms are interposed between the engine 6 and the individual wheels as described hereinbefore in conjunction with the third embodiment, torque of a same magnitude acts on the two shafts disposed at the output side of the differential mechanism. Accordingly, the torque sensor may be provided at the shaft disposed at the input side of the differential mechanism to detect the torque appearing at the output of the engine. In other words, in the four-wheel driven motor vehicle, the output power of the engine 6 is divided into front and rear driving wheel systems, respectively, and again divided into left and right driving wheels in both the front and rear systems. In that case, the torque sensor may be interposed between the engine 6 and the differential mechanism for dividing the engine output power to the front and rear driving wheel systems for thereby determining the torsion torque applied to the four wheels.

Further, when the torsion torque is arithmetically determined by detecting the engine rotation number (rpm) as described hereinbefore in conjunction with the fourth embodiment in the four-wheel driven type motor vehicle equipped with the differential mechanisms for transmitting the engine torque to four driving wheels, the expression (9) mentioned hereinbefore can be used for determining the torsion torque while in the motor vehicle in which the differential mechanism is provided for dividing the engine output power into the front and rear driving wheel systems, the torsion torques of the front and rear wheels may be determined in accordance with the expression (8), substantially to the same effect as in the case of the first embodiment.

Further, the procedure for detecting the engine rotation number may be equally be applied for detecting the rotation speed (rpm) of the drive shaft 33.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, a storage or recording media on which the teachings of the invention are recorded in the form of programs executable by computers inclusive of microprocessor are to be covered by the invention.

Accordingly, all suitable modifications and equivalents may be resorted to, falling within the spirit and scope of the invention.

What is claimed is:

1. An anti-lock brake control system for a motor vehicle for applying brake to said motor vehicle in safety while avoiding occurrence of a wheel-locked state by repeating operation for lowering a braking hydraulic pressure when a wheel speed decreases upon braking to a level at which said wheel-locked state is likely to occur and increasing again said braking hydraulic pressure when the wheel speed is recovered as a result of said lowering of the braking hydraulic pressure, comprising:

wheel speed detecting means for detecting a rotation speed of each of the wheels of said motor vehicle;

wheel acceleration arithmetic means for arithmetically determining acceleration of the wheel on the basis of the wheel speed obtained by said wheel speed detecting means;

torsion torque detecting means for detecting a torsion torque applied to a driving shaft for operatively connecting each of said wheels to driving means;

corrected acceleration arithmetic means for arithmetically determining a corrected acceleration by correcting the wheel acceleration obtained from said wheel acceleration arithmetic means with the torsion torque obtained by said torsion torque detecting means;

control command means for issuing a command for changing a brake force increasing slope in dependence on status of said wheel acceleration indicating behavior of the wheel and status of said corrected acceleration indicating influence of the torsion torque, respectively; and brake force regulating means for controlling the brake force in accordance with said command.

2. An anti-lock brake control system according to claim 1, further comprising:

filtering means for determining arithmetically a second wheel acceleration by eliminating transient variation of said wheel acceleration through a filtering processing, wherein said control command means controls the brake force by changing said brake force increasing slope when said wheel acceleration is smaller than a predetermined value or when said corrected acceleration is smaller than a predetermined value in the state where said second wheel acceleration is smaller than a predetermined value.

3. An anti-lock brake control system according to claim 1, wherein said control command means decreases said brake force increasing slope by holding the brake force when said second wheel acceleration is smaller than a predetermined value with said wheel acceleration being smaller than a predetermined value and when said corrected acceleration is smaller than a predetermined value.

4. An anti-lock brake control system according to claim 1, further comprising:

vehicle body acceleration calculating means for determining a deceleration of the vehicle body, wherein said control command means controls the brake force by changing the brake force increasing slope in dependence on the status of said vehicle body indicated by said deceleration of the vehicle body, said wheel acceleration indicating behavior of the wheel and said corrected acceleration indicating influence of said torsion torque, respectively.

5. An anti-lock brake control system according to claim 1, wherein said control command means controls said brake force by changing the brake force increasing slope in dependence on detection that a brake force decreasing control is started for at least one of the other wheels than that controlled correctly, said wheel acceleration indicating behavior of the wheel and said corrected acceleration indicating influence of said torsion torque.

6. A method of controlling a brake force in an anti-lock brake control system for a motor vehicle for applying brake to said motor vehicle in safety while avoiding occurrence of a wheel-locked state by repeating operation for lowering a braking hydraulic pressure when a wheel speed decreases upon braking to a level at which said wheel-locked state is likely to occur and increasing again said braking hydraulic pressure when the wheel speed is recovered as a result of said lowering of the braking hydraulic pressure, comprising the steps of:

detecting a rotation speed of each of the wheels of said motor vehicle;

arithmetically determining acceleration of the wheel on the basis of the detected wheel speed;

detecting a torsion torque applied to a driving shaft operatively connecting each of said wheels to driving means;

arithmetically determining a corrected acceleration by correcting said wheel acceleration with said torsion torque;

issuing a command for changing a brake force increasing slope in dependence on status of said wheel acceleration and status of said corrected acceleration indicating influence of the torsion torque, respectively; and controlling the brake force in accordance with said command.

* * * * *